(12) United States Patent
Hauber

(10) Patent No.: US 11,873,947 B2
(45) Date of Patent: Jan. 16, 2024

(54) HIGH PRESSURE COMPOSITE PRESSURE VESSEL METHOD OF MANUFACTURE AND PRODUCT

(71) Applicant: Trelleborg Sealing Solutions Germany GmbH, Stuttgart (DE)

(72) Inventor: David Edgar Hauber, Troy, NY (US)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 17/664,283

(22) Filed: May 20, 2022

(65) Prior Publication Data
US 2022/0381401 A1  Dec. 1, 2022

Related U.S. Application Data

(60) Provisional application No. 63/193,426, filed on May 26, 2021.

(51) Int. Cl.
*B29C 70/14* (2006.01)
*F17C 1/06* (2006.01)
(Continued)

(52) U.S. Cl.
CPC .............. *F17C 1/06* (2013.01); *B29C 70/14* (2013.01); *B29C 70/32* (2013.01); *B29K 2105/14* (2013.01); *B29K 2307/04* (2013.01); *B29L 2031/7156* (2013.01); *F17C 2201/0109* (2013.01); *F17C 2201/0128* (2013.01); *F17C 2201/0138* (2013.01);
(Continued)

(58) Field of Classification Search
CPC ..... B29C 70/14; B29C 70/32; B29K 2105/14; B29L 2031/7156; F17C 2201/0109; F17C 2201/0128; F17C 2201/0138; F17C 2201/0152; F17C 2203/0621; F17C 2203/0673; F17C 2209/2109; F17C 2209/2163; F17C 2209/232; F17C 2221/012; F17C 2221/033; F17C 2223/036; F17C 2270/0171
See application file for complete search history.

(56) References Cited

U.S. PATENT DOCUMENTS 4,699,288 A  10/1987  Mohan
6,716,503 B1  4/2004  Hauber
(Continued)

*Primary Examiner* — Vishal I Patel
(74) *Attorney, Agent, or Firm* — Orbit IP

(57) ABSTRACT

A method of manufacturing a high-pressure composite pressure vessel for high-pressure being at or above 70 bar (1000 PSI or 7 MPa) includes providing an expandable core vessel defining a hoop section between end domes. An aligned discontinuous fiber composite material is wrapped over the expandable core vessel aligning with a plurality of load paths present in the expandable core vessel being over the hoop section and end domes. The aligned discontinuous fiber composite material has fibers in a prepreg tape that are at least 5 mm in length to 100 mm in length or less. Next, a continuous fiber-reinforced composite is wrapped over the aligned discontinuous fiber-reinforced composite along the hoop section and not wrapped along the end domes. The expandable core vessel may be pressurized and heated to consolidate the composite overwrap. Finally, the vessel is cooled under pressure resulting in the high-pressure composite pressure vessel.

20 Claims, 15 Drawing Sheets

(51) Int. Cl.
*B29C 70/32* (2006.01)
*B29K 307/04* (2006.01)
*B29K 105/14* (2006.01)
*B29L 31/00* (2006.01)

(52) U.S. Cl.
CPC ............... *F17C 2201/0152* (2013.01); *F17C 2203/0621* (2013.01); *F17C 2203/0673* (2013.01); *F17C 2209/2109* (2013.01); *F17C 2209/2163* (2013.01); *F17C 2209/232* (2013.01); *F17C 2221/012* (2013.01); *F17C 2221/033* (2013.01); *F17C 2223/036* (2013.01); *F17C 2270/0171* (2013.01)

(56) References Cited

U.S. PATENT DOCUMENTS

| | | |
|---|---|---|
| 6,893,604 B2 | 5/2005 | Hauber |
| 10,436,388 B2 | 10/2019 | Lee |
| 2004/0168773 A1* | 9/2004 | Hauber ............... B65D 90/029 156/425 |
| 2005/0006824 A9* | 1/2005 | LeBreton ............... F16J 12/00 264/102 |

* cited by examiner

Figure 13: Comparison of Open-Hole Tension Strength of Continuous IM7/8552, Stretch Broken "As Made, and Stretched at Prepreg Level (by overall 10%)

Note: There is a theoretical basis that stretch broken fibers can actually be HIGHER than non-stretch broken for tensile strength.

HIGH PRESSURE COMPOSITE PRESSURE VESSEL METHOD OF MANUFACTURE AND PRODUCT

CROSS-REFERENCE TO RELATED APPLICATIONS

This application claims priority to U.S. Provisional Application No. 63/193,426 filed May 26, 2021, the entire contents of which are hereby incorporated in full by this reference.

DESCRIPTION

Field of the Invention

The present invention relates to pressure vessels, and, more particularly, to high-pressure composite pressure vessels and the method of manufacture thereof.

Background of the Invention

Hydrogen is a zero-emission fuel, and fuel cells using hydrogen can offer the most efficient use of stored energy. The problem is that hydrogen is very low density and must be compressed at high pressures to store sufficient energy for many applications. For applications such as ground transportation, e-Mobility, and especially urban air mobility (UAM), weight must be minimized. Composite overwrapped pressure vessels (COPV) offer high strength-to-weight ratio compared to metal pressure vessels, but existing technology is suboptimal.

It is well known within the state of the art that composite materials can be used to reduce the weight of pressure vessels starting in the 1980s. Pressure vessels are classified by increased composite material content as follows:
  Type I: all metal construction;
  Type II: metal liner with composite hoop wrap only;
  Type III: metal liner with full composite overwrap;
  Type IV: all composite construction with polymer liner; and
  Type V: liner-less, all composite construction;

The current state-of-the-art in COPVs is filament winding with thermoset composites. For example, U.S. Pat. No. 4,699,288 teaches filament winding layers of thermoset composites and an elastomeric liner to improve damage tolerance. However, elastomeric liners increase weight.

Filament winding is a standard composite manufacturing process involving automatically wrapping a continuous fiber composite around a closed section structure such as a cylinder. Filament winding involves wrapping continuous fibers (such as carbon fiber) typically in a thermoset matrix (such as epoxy) around a polymer liner (in the case of Type IV COPVs) and then curing at elevated temperature to crosslink the resin.

There are several problems with this approach, including: filament winding limits the possible fiber paths and results in excess fibers at the dome ends (the diameter decreases but the same amount of fiber is wrapped); curing of the thermoset resin results in shrinking and debulking that induces wrinkling of the fibers which reduces the ability of the fibers to carry the applied loads; and thermoset resins are brittle compared to thermoplastic resins reducing damage tolerance.

The current state of the art attempts to reduce these problems with increasingly complex strategies for filament winding of thermoset composites. For example, U.S. Pat. No. 10,436,388 B2 teaches control of the filament wound overwrap patterns to limit induced stress and excess buildup at the end domes that result from the filament winding process. However, the resulting discontinuities induce stress concentrations in the structure reducing structural efficiency and fatigue life. Thus, FIG. 1 of the '388 patent and FIG. 1 of this patent application shows a filament wound COPV having excess buildup at the end domes and ply drops resulting in stress variations as shown in the Applicant's FIG. 2.

There is a need to improve damage tolerance of COPVs for improved safety, to improve fatigue life for longer service life and recyclability at end of life. Thermoplastic composites can be used for these and other advantages.

U.S. Pat. Nos. 6,716,503 B1 and 6,893,604 B2 teach a product and method of manufacture for thermoplastic composite pressure vessels that involves cooling and applying pressure to the inside while heating the outside to consolidate the continuous fiber thermoplastic composite. This technique has been demonstrated to achieve near theoretical fiber translation at low pressures (less than 1000 PSI, 7 MPa, 70 bar), fiber translation being the theoretical weight of fiber needed to withstand the pressure in a cylinder divided by the actual weight of the fiber. This is due to the internal pressure forcing the fibers to realign to more equally distribute the applied load when they are in the molten thermoplastic matrix. This has been demonstrated to result in a 20% weight savings, higher fatigue life, and improved damage tolerance than comparable thermoset composite pressure vessels. Furthermore, the consistent fiber translation results in less variation in burst pressure which allows lower safety factors for further weight savings. It should be noted that the present invention is not limited to thermoplastic composite COPVs, being equally advantageous for thermoset as well as thermoplastic COPVs or combinations thereof. FIG. 2 from U.S. Pat. No. 6,893,604 B2 shows a reinforced thermoplastic storage vessel manufacturing method.

Data from the U.S. Department of Energy on the current state of the art for compressed hydrogen storage includes the following. With respect to existing technology as to fiber translation efficiency, FIG. 3 is provided. With respect to variation in fiber and manufacturing resulting in higher safety factor and weight, FIG. 4 is provided.

However, the advantages of the approach relative to the aforementioned product and method of manufacture for thermoplastic composite pressure vessels (referencing U.S. Pat. Nos. 6,716,503 B1 and 6,893,604 B2) are not achieved at high pressures. High pressure herein refers to pressures generally above 70 bar (1000 PSI or 7 MPa); for example, compressed hydrogen is typically greater than 700 bar, and CNG is typically greater than 200 bar. The reason for this lack of achievement at high pressures is that high strength fibers, such a carbon fiber, do not have sufficient elongation to accommodate the expansion due to the bulk factor in thick wall laminates as they are being consolidated. As the inner layers expand due to internal pressure the continuous carbon fibers are limited to about 1.5% elongation before they break, and the breakage can be catastrophic resulting in rupture. As understood in the art, bulk factor is the thickness of an unconsolidated composite laminate divided by the consolidated thickness.

Further, it is known within the state of the art that continuous fibers improve strength and modulus over discontinuous fibers. For example, chopped carbon fiber filled PEEK polymer has a strength and modulus of 0.33 and 43 GPa respectively compared to continuous fiber PEEK prepreg with 2.1 and 138 GPa respectively (PEEK being Polyetheretherkeytone, a high-performance thermoplastic polymer). Prepreg, herein, refers to preimpregnated composite tape, that is, fibers held in a polymer matrix in the form of a tape.

What is needed in the art is a method for manufacturing high-pressure composite vessels for applications such as hydrogen gas storage that are lighter weight, damage tolerant, less expensive, and recyclable, and such a high-pressure composite vessel.

U.S. Pat. Nos. 4,699,288; 10,436,388; 6,716,503 B1; and 6,893,604 are incorporated in full herein with these references.

SUMMARY OF THE INVENTION

The present invention provides a method for manufacturing high-pressure composite vessels for applications such as hydrogen gas storage that are lighter weight, damage tolerant, less expensive, and recyclable, and such a high-pressure composite vessel. That is, the present invention applies to COPVs, and other structures, that are required to contain gas and/or liquids at high pressure while minimizing weight. In improving upon the existing state of the art of COPVs and thereby improving the energy storage capacity of pressure vessels, the present invention uses a novel combination of existing (at least in part) technologies.

Relative to the aforementioned five types of pressure vessels, the present invention primarily involves Type IV pressure vessels for high energy storage efficiency (energy content/weight of pressure vessel) with a liner for reduced permeability. However, Type V pressure vessels may also be manufactured according to the present invention, provided that the manufacturing process includes a mandrel that includes an expandable way for providing internal pressure during consolidation and removal after consolidation, as described herein. Such mandrels include but are not limited to inflatable, shape memory, and dissolvable materials.

Though it is known that continuous fibers improve strength and modulus over discontinuous fibers, it is not, however, generally understood by those skilled in the art that there is a critical fiber length beyond which strength and/or modulus does not significantly improve. This is the point where the bond between the fiber and the matrix exceeds the strength of the fiber. The graph of FIG. 5 shows fiber length vs. certain properties (modulus, strength, and impact) and illustrates that fibers of length of 10 to 100 mm retain most, if not all, of their properties when aligned in a prepreg tape. Thus, the present invention uses aligned discontinuous fiber composites to allow the fibers to move within the composite before it is fully consolidated.

The present invention thus provides a product and the method of manufacture of high-pressure composite pressure vessels for applications such as hydrogen gas storage that are lighter weight, damage tolerant, less expensive and recyclable. It extends prior art for thin wall pressure vessels to high pressure applications such as compressed hydrogen storage. More specifically, the present invention advances the state of the art by improving on the method disclosed in U.S. Pat. No. 6,893,604 B2 by extending the pressure range and improving structural efficiency for high pressure COPVs and similar structures. Conformable storage vessels (conformable storage approaches being shown in following paragraphs) may particularly benefit from the present invention.

The invention in one embodiment is directed to a method of manufacturing a high-pressure composite pressure vessel, the method including the steps of: providing aligned discontinuous fiber composite materials; wrapping an expandable core with discontinuous fiber reinforced composites such that the fibers are generally aligned with the load paths present in the pressurized COPV; pressurizing the expandable core, and optionally heating the wrapped COPV, so that the core expands applying pressure to the composite overwrap; heating the COPV to consolidate the composite overwrap; providing a way to constrain the expansion; and allowing the consolidated COPV to cool under pressure. The composite material can be a thermoplastic composite or a thermoset composite. The expandable core can be a polymer liner, a bladder, and/or a shape memory bladder. The way for constraining the expansion can include a continuous fiber composite overwrap, a mold, and/or a higher temperature polymer film or any other suitable means.

The invention in another embodiment is directed to a high pressure composite pressure vessel, wherein the pressure vessel is manufactured by: providing aligned discontinuous fiber composite materials; wrapping an expandable core with discontinuous fiber reinforced composites such that the fibers are generally aligned with the load paths present in the pressurized COPV; pressurizing the expandable core, and optionally heating the wrapped COPV, so that the core expands applying pressure to the composite overwrap; heating the COPV to consolidate the composite overwrap; providing a way to constrain the expansion; and allowing the consolidated COPV to cool under pressure, wherein the COPV that has been cooled under pressure is the pressure vessel (the product) of the present invention made by these manufacturing steps. The composite material can be a thermoplastic composite or a thermoset composite. The expandable core can be a polymer liner, a bladder, and/or a shape memory bladder. The way for constraining the expansion can include a continuous fiber composite overwrap, a mold, and/or a higher temperature polymer film. The high-pressure composite pressure vessel can be conformable. Conformable pressure vessels are pressure vessels of non-cylindrical shapes that are designed to conform to a given space, maximizing the use of this space.

The invention in yet another embodiment is directed to a high-pressure pressure vessel, the pressure vessel including a body that is configured for holding a pressurized medium and withstanding medium pressures generally above 70 bar (1000 PSI or 7 MPa). The pressure vessel can be a COPV and include a wall that holds the medium and withstands the medium's high pressure, where the enclosing wall is made of a composite material. The wall can be made from discontinuous fiber reinforced composites such that the fibers are generally aligned with the load paths present in the pressurized COPV. The pressure vessel can hold compressed hydrogen, which is typically greater than 700 bar, or CNG which is typically greater than 200 bar.

An advantage of the present invention is that it provides an improved way to store compressed gas and/or liquids at high pressures.

Another advantage of the present invention is that it provides improved damage tolerance, improved fatigue life, reduced cost, improved fatigue life, and recyclability.

Yet another advantage of the present invention is that applications include but are not limited to hydrogen, compressed natural gas, and air.

Yet another advantage of the present invention is that it may be employed where weight must be minimized, such as launch vehicles, air transportation, and ground transportation. Additional applications can benefit from reduced cost, damage tolerance, improved fatigue life and recyclability.

Yet another advantage of the present invention is that it overcomes the aforementioned catastrophic breakage of continuous carbon fibers resulting in rupture. It does so by applying an improved approach for thick walled COPVs for high pressure applications.

Yet another advantage of the present invention is that it provides embodiments of a method of manufacture in which thermoplastic high-pressure composite overwrapped pressure vessels can be consolidated.

BRIEF DESCRIPTION OF THE DRAWINGS

The above-mentioned and other features and advantages of the present invention, and the manner of attaining them, will become more apparent and the invention will be better understood by reference to the following description of embodiments of the invention taken in conjunction with the accompanying drawing, wherein.

Corresponding reference characters indicate corresponding parts throughout the several views. The exemplifications set out herein illustrates embodiments of the invention, and such exemplifications are not to be construed as limiting the scope of the invention in any manner.

DETAILED DESCRIPTION OF THE PREFERRED EMBODIMENTS

Figure 1:
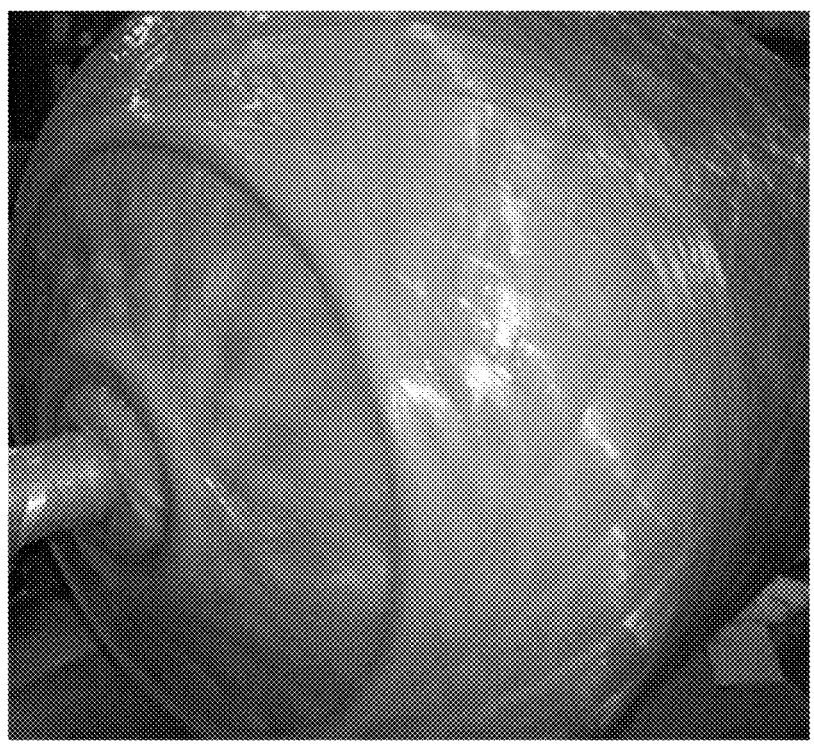
FIG. 1 is a picture of a composite overwrapped pressure vessel according to U.S. Pat. No. 10,436,388.
Figure 2:
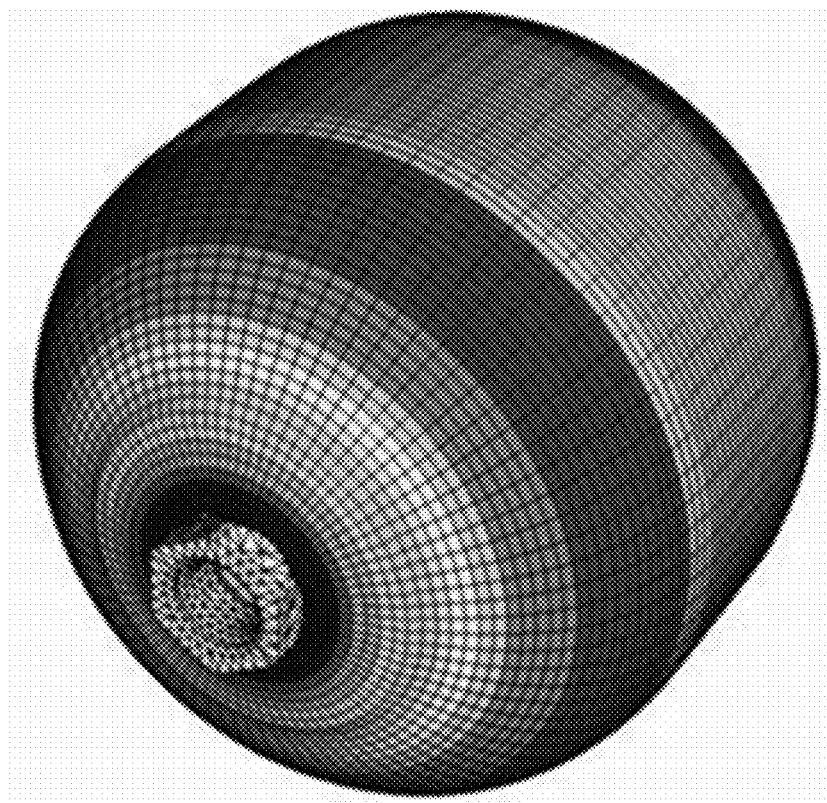
FIG. 2 is a perspective view showing the varying levels of stress of a composite overwrapped pressure vessel according to U.S. Pat. No. 10,436,388.
Figure 3:
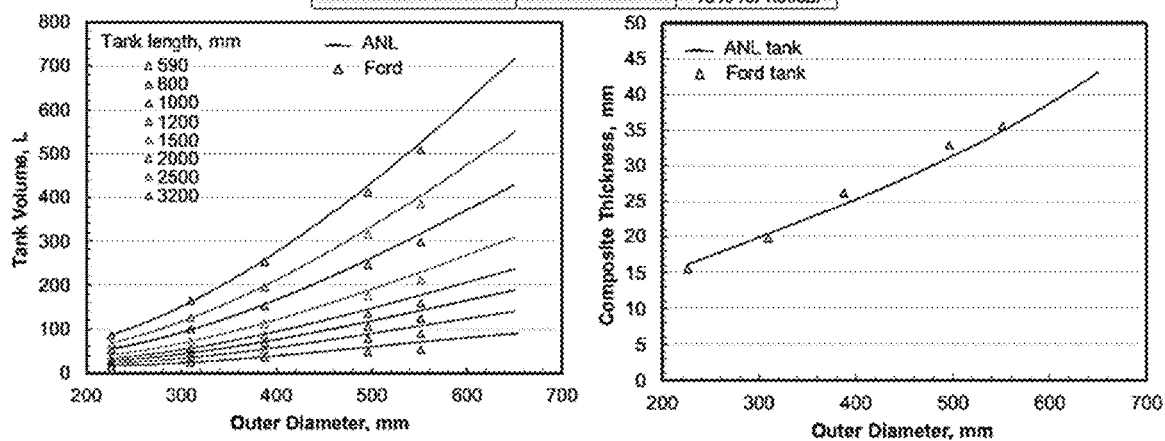
FIG. 3 is data from the U.S. Department of Energy with respect to existing technology as to fiber translation efficiency.
Figure 4:
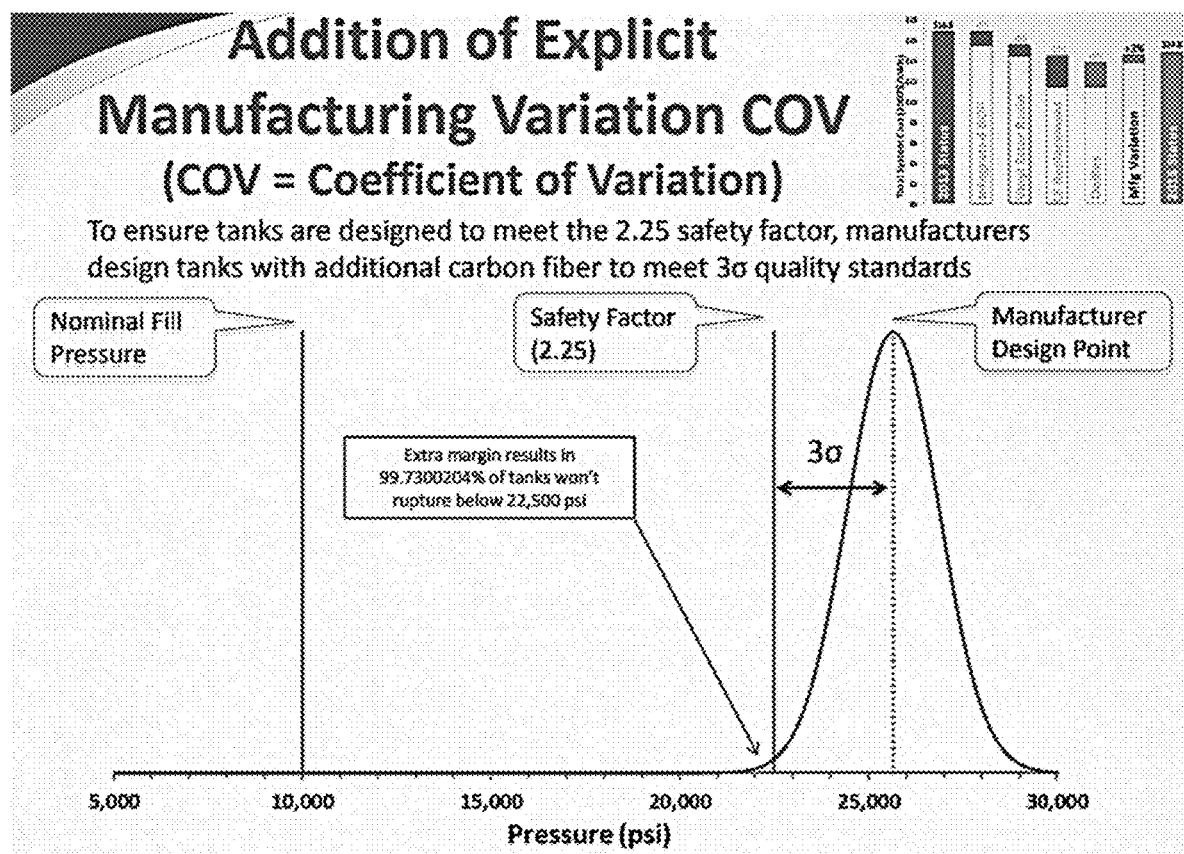
FIG. 4 is data from the U.S. Department of Energy with respect to variation in fiber and manufacturing resulting in higher safety factor and weight.
Figure 5:
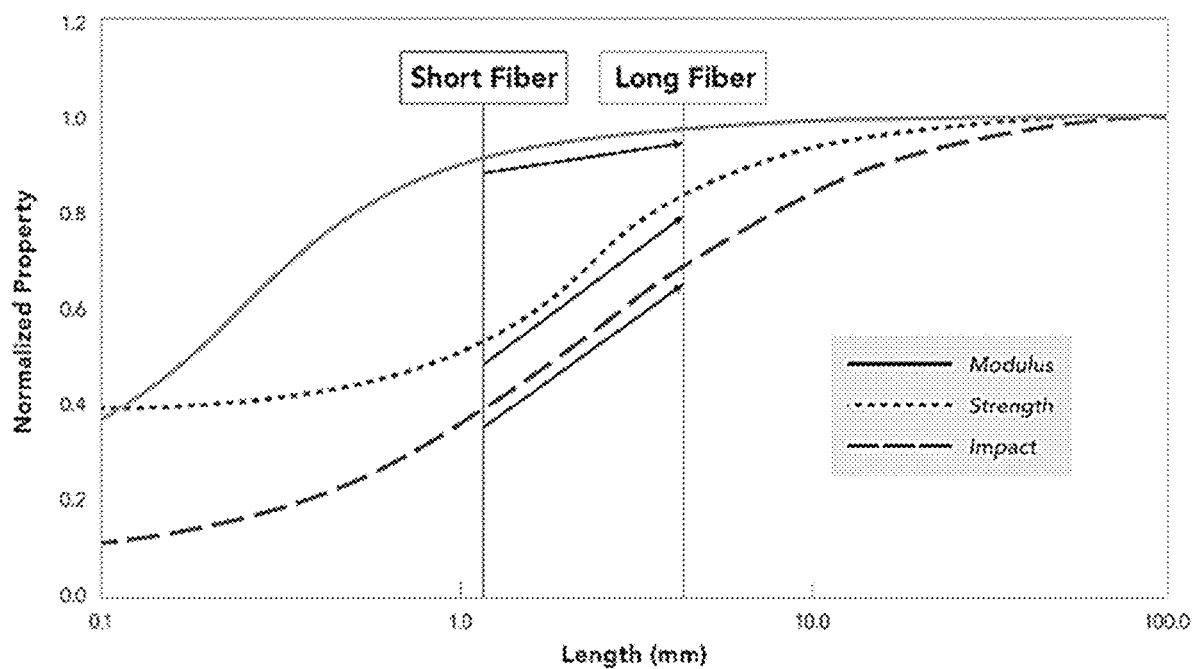
FIG. 5 is a generalized graph of fiber length versus certain properties (modulus, strength, and impact) and illustrates that fibers of length of 10 to 100 mm retain most, if not all, of their properties when aligned in a prepreg tape.
Figure 6:
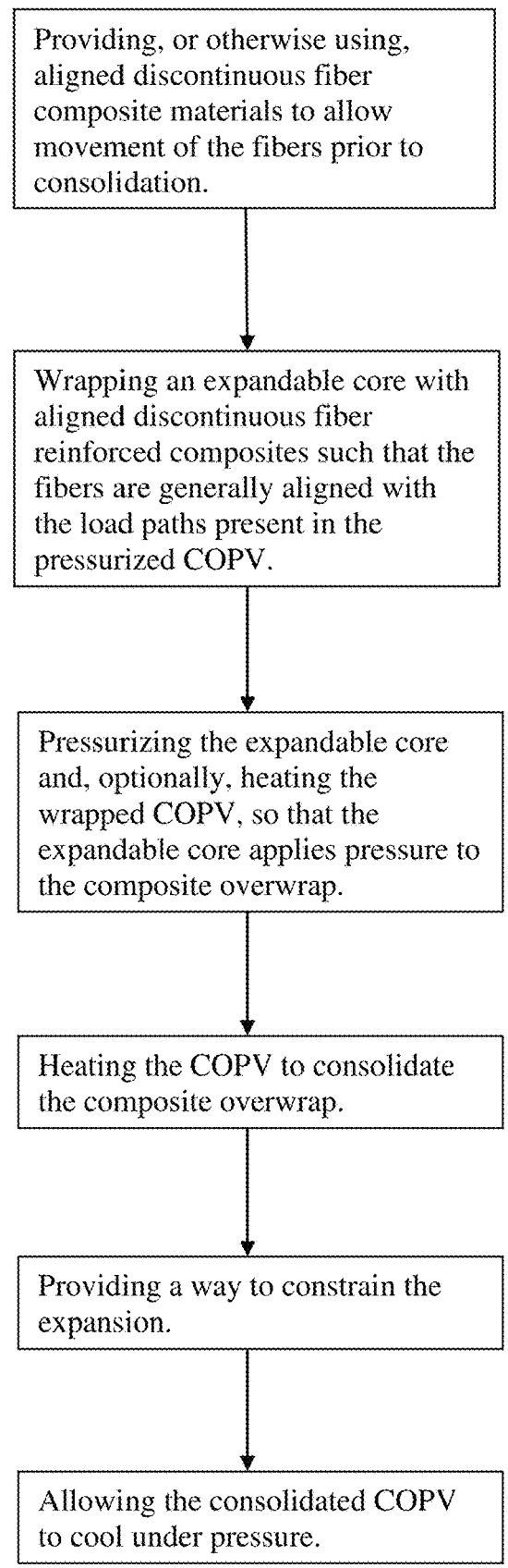
FIG. 6 is a flow diagram showing an embodiment of the method of manufacture according to the present invention.

Referring now to the drawings, and more particularly to FIG. 6, there is shown a flow diagram which generally shows the method of manufacturing the high-pressure composite pressure vessel according to the present invention. The method of manufacturing the high pressure composite pressure vessel of the present invention includes: providing or otherwise using aligned discontinuous fiber composite materials to allow movement of the fibers prior to consolidation; wrapping an expandable core with aligned discontinuous fiber reinforced composites such that the fibers are generally aligned with the load paths present in the pressurized COPV; pressurizing the expandable core and, optionally, heating the wrapped COPV so that the expandable core applies pressure to the composite overwrap; heating the COPV to consolidate the composite overwrap; providing a way to constrain the expansion; and allowing the consolidated COPV to cool under pressure.

The present invention employs aligned discontinuous fiber reinforcement. The materials method used to produce such aligned discontinuous fiber composites can be conventional, but those skilled in the art will understand that some methods are more advantageous. Such methods include: maximum alignment of the fibers in a single direction; minimum fiber length exceeds the critical fiber length; randomized alignment of breaks in the fibers within the composite; breaks in the fibers occur at weak points along the continuous fiber.

Manufacturers of aligned discontinuous fiber material/reinforcement include, but are not limited to, University of Delaware, Montana State University, Hexcel (Dublin, Calif.), Pepin Assoc. (Greenville, Me.), Pharr Yarns (McAdenville, N.C.), Schappe Techniques (Charnoz, France), and Advanced Composites Group Ltd. (ACG, Heanor, Derbyshire, U.K.). The products of these manufacturers differing to a degree from one another, one skilled in the art may choose which product is most suitable for the specific application.

Figure 7:
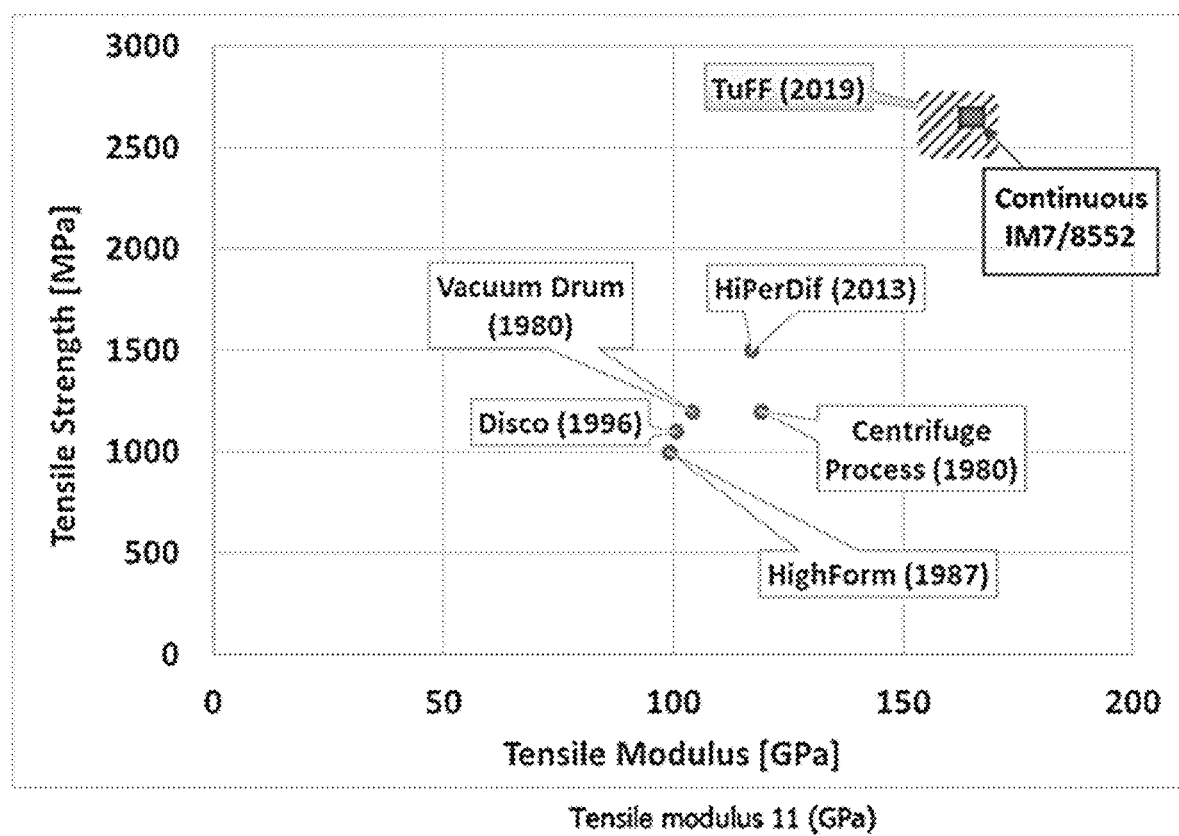
FIG. 7 is a graph showing Tailored universal Feedstock (TuFF) for Forming compared to other discontinuous fiber reinforced and continuous fiber composites.

Continuing along this vein, the following data in FIG. 7 shows that aligned discontinuous fiber reinforcement can be as strong as or stronger than continuous fiber reinforcement in a composite structure. The University of Delaware has developed Tailored universal Feedstock for Forming (TuFF). The graph of FIG. 7 shows TuFF compared to other discontinuous fiber reinforced and continuous fiber composites.

Figure 8:
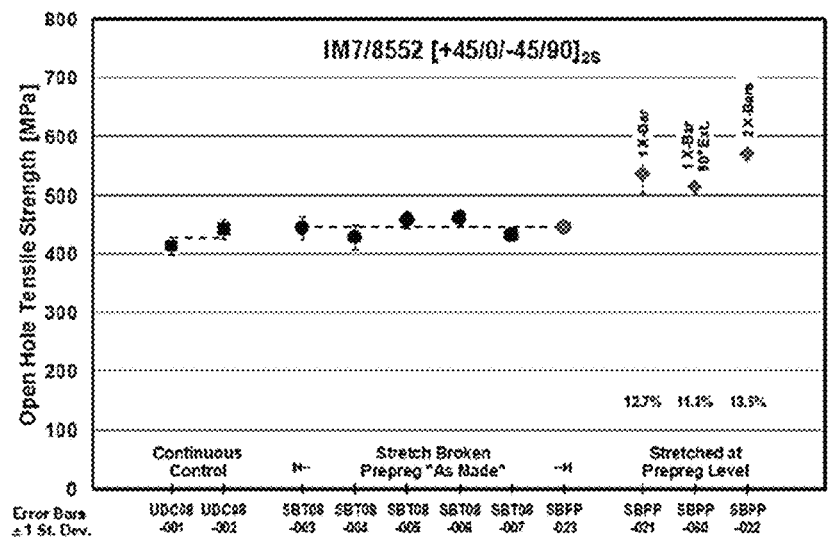
FIG. 8 is a graph from the Hexcel corporation which shows that stretch broken fiber can have higher properties than continuous fiber.

The following data of FIG. 8 is associated with Hexcel Corporation which shows that stretch broken fiber can have higher properties than continuous fiber (stretch broken fiber refers to continuous fiber prepreg in this case that are stretched so that some of the individual fibers are broken creating an aligned discontinuous fiber band). (See the following weblink for more information: https://www.researchgate.net/publication/268049934_CHARACTERIZA-TION_OF_STRETCH_BROKEN_CARBON_FIBER_COMPOSITES_-_IM7_FIBER_IN_8552_RESIN_-_STRETCHED_AT_PREPREG_LEVEL/figures?lo=1)

Regarding the fiber application process, one skilled in the art may choose from a variety of existing (at least in part) methods, depending upon the specific application, by which the aligned discontinuous fiber reinforcement is applied to form a composite structure. Three such methods, which may be advantageously employed with respect to the present invention, are now outlined.

Figure 9:
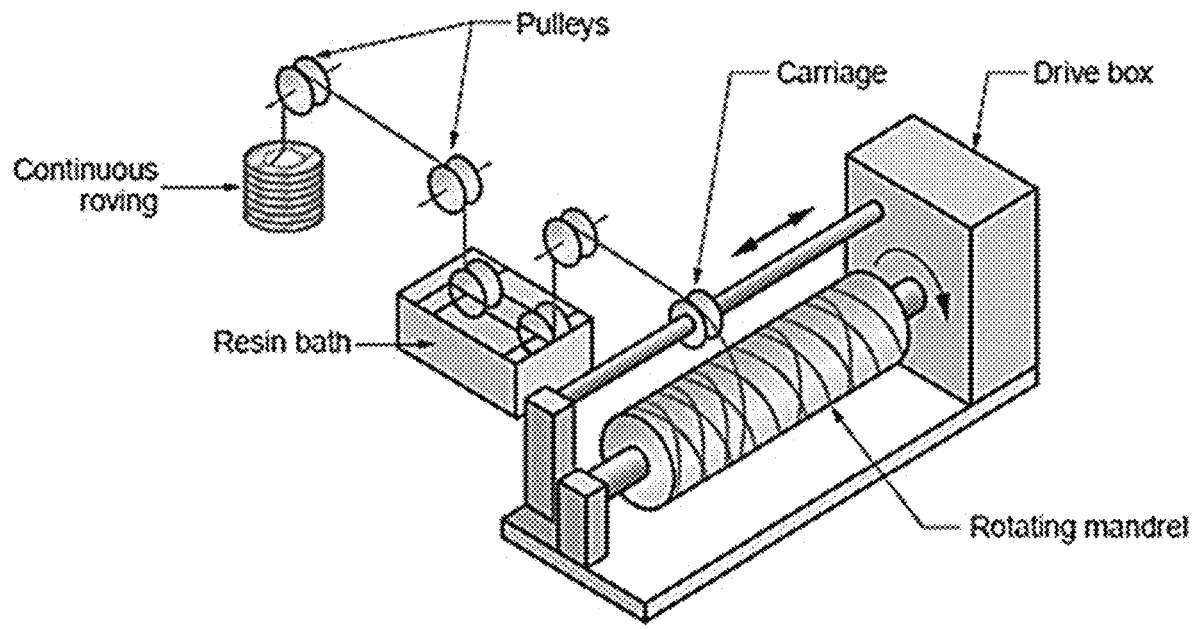
FIG. 9 is a perspective view of a method of filament winding, which can be used to apply aligned discontinuous fiber reinforcement, in accordance with the present invention.

A first method of applying the aligned discontinuous fiber reinforcement is filament winding. U.S. Pat. No. 6,893,604 B2 (Reinforced Thermoplastic Storage Vessel Manufacture) teaches filament winding of continuous fiber reinforcement. Filament winding is a simple method to wrap closed-section structures such as pressure vessels. However, it requires continuous bands wrapped in near geodesic paths that may not be in the direction of the applied loads for structures including COPVs. Filament winding also results in buildups at the end domes of COPVs that add weight, thereby reducing structural efficiency. Theoretically, a cylindrical pressure vessel requires twice the reinforcement in the circumferential direction than in the axial direction. However, filament winding does not allow fibers to be placed in pure circumferential or axial directions. FIG. 9 shows an embodiment of the method of filament winding that can be used in accordance with the present invention.

Figure 10:
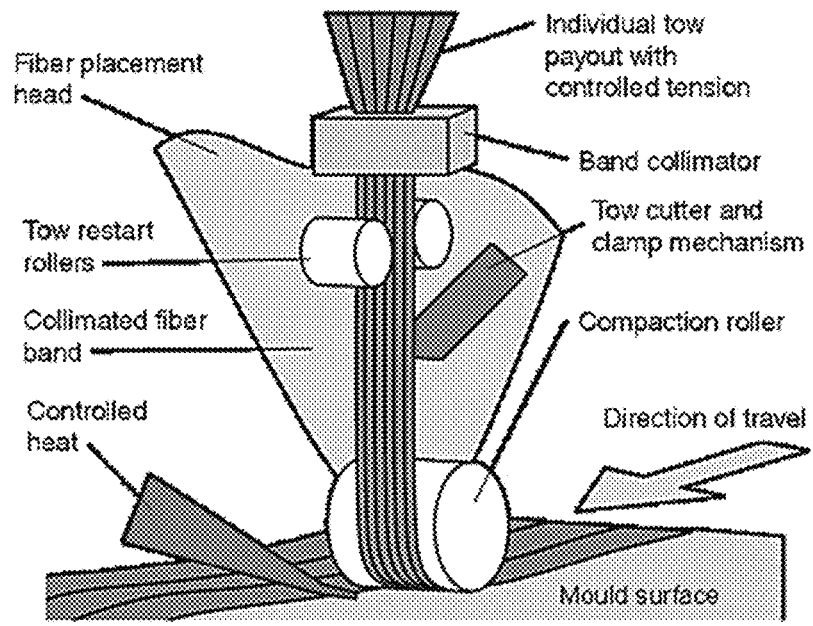
FIG. 10 is a perspective view of a method of fiber placement, which can be used to apply aligned discontinuous fiber reinforcement, in accordance with the present invention.

A second method of applying the aligned discontinuous fiber reinforcement is fiber placement. Fiber placement allows composite fibers to be placed in any direction and can start and cut the composite bands automatically. However, it is not as fast as filament winding due to the necessity of following the surface with a compaction roller as well as cutting and restarting the prepreg. Automated Fiber Placement (AFP) can be adapted and employed, wherein AFP is a standard composite manufacturing process involving automatically placing continuous fiber composite onto structure including cutting and starting strips to optimize the structure. FIG. 10 shows an embodiment of the method of fiber placement that can be used in accordance with the present invention.

Figure 11:
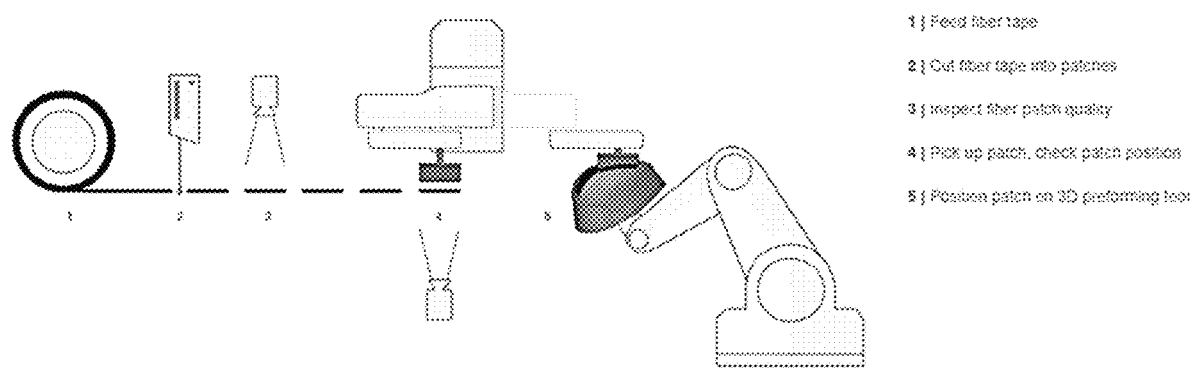
FIG. 11 is a perspective view of a method of fiber patch placement, which can be used to apply aligned discontinuous fiber reinforcement, in accordance with the present invention.

A third method of applying the aligned discontinuous fiber reinforcement is fiber patch preforming. Fiber patch preforming is an automated process of placing small patches of composite material onto a structure. For instance, fiber patch preforming automatically places patches of fiber reinforced composites onto a mold. By making the patches longer than the minimum fiber length, offsetting the cuts, and placing the fibers in the load paths, fiber patch preforming can achieve aligned discontinuous fiber reinforcement over structures such as COPVs. FIG. 11 shows an embodiment of the method of fiber patch placement that can be used in accordance with the present invention.

Regarding the consolidation processes, the present invention provides for development of an existing process. U.S. Pat. No. 6,893,604 B2 (Reinforced Thermoplastic Storage Vessel Manufacture) teaches pressurizing the inside of the pressure vessel, heating from the outside, and cooling the inside. This approach can be employed in the present invention, with the critical difference being the use of aligned discontinuous fiber composites and a way to allow the expansion the fiber reinforcement to compensate for the bulk factor of the COPV during consolidation along with a way to limit the expansion.

Any suitable way can be used to heat, pressurize, and limit the expansion. Heating methods include, but are not limited to, the following: heated liquid on the inside; heated gas on the inside; heated gas on the outside; IR (infrared) heating on the inside; IR heating on the outside; and flame heating on the outside. Pressurizing methods include, but are not limited to, the following: pressurized gas on the inside; pressurized liquid on the inside; vacuum on the outside; and internal pressure with external vacuum.

Figure 12:
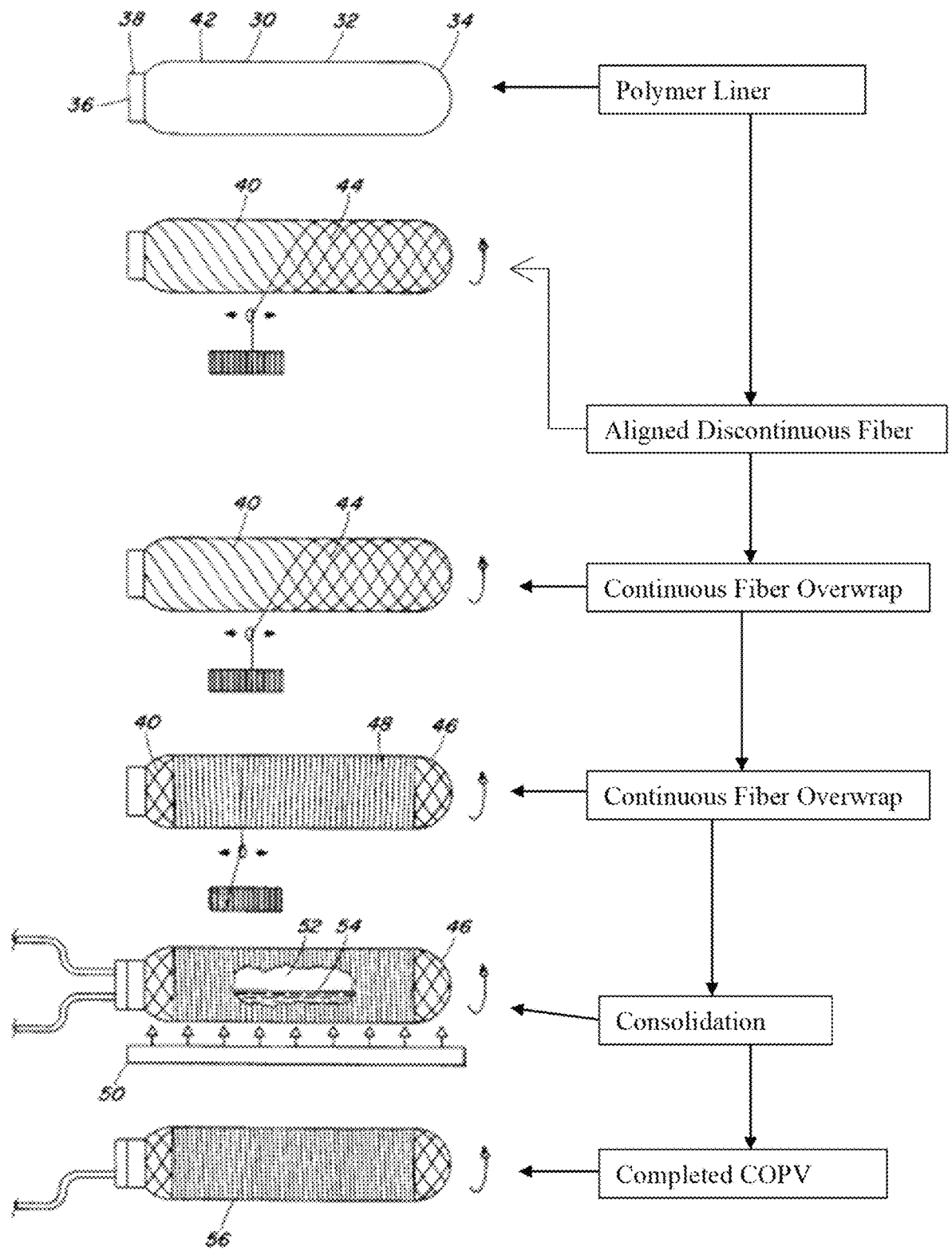
FIG. 12 is a flow diagram showing another embodiment of the method of manufacture according to the present invention, together with side views of the method steps.

Referring now to FIG. 12, there is shown another embodiment of the method of manufacture the pressure vessel of the present invention (the arrows pointing down from the text blocks showing the progression of the method, the arrows proceeding pointing to the left of the text blocks pointing to illustrations of the particular step). This embodiment of the method of the present invention can be used in combination with the embodiment of the method of the present invention shown in FIG. 6, the embodiment shown in FIG. 12, however, focusing primarily on showing the type of fibers employed at certain stages of the method. In the first step in FIG. 12, a polymer liner is provided. Next, the polymer liner is overwrapped with aligned discontinuous fibers. Next, the polymer liner is overwrapped with continuous fibers, which can be applied in two steps, in two different directions, or in a single step. The continuous fiber overwrap constrains the expansion during consolidation with heat and internal pressure. Next, consolidation occurs. The consolidation step may optionally include coolant 54; on the other hand, such coolant 54 is optionally not employed in the method of manufacture. Finally, the COPV according to the present invention is obtained.

Figure 13:
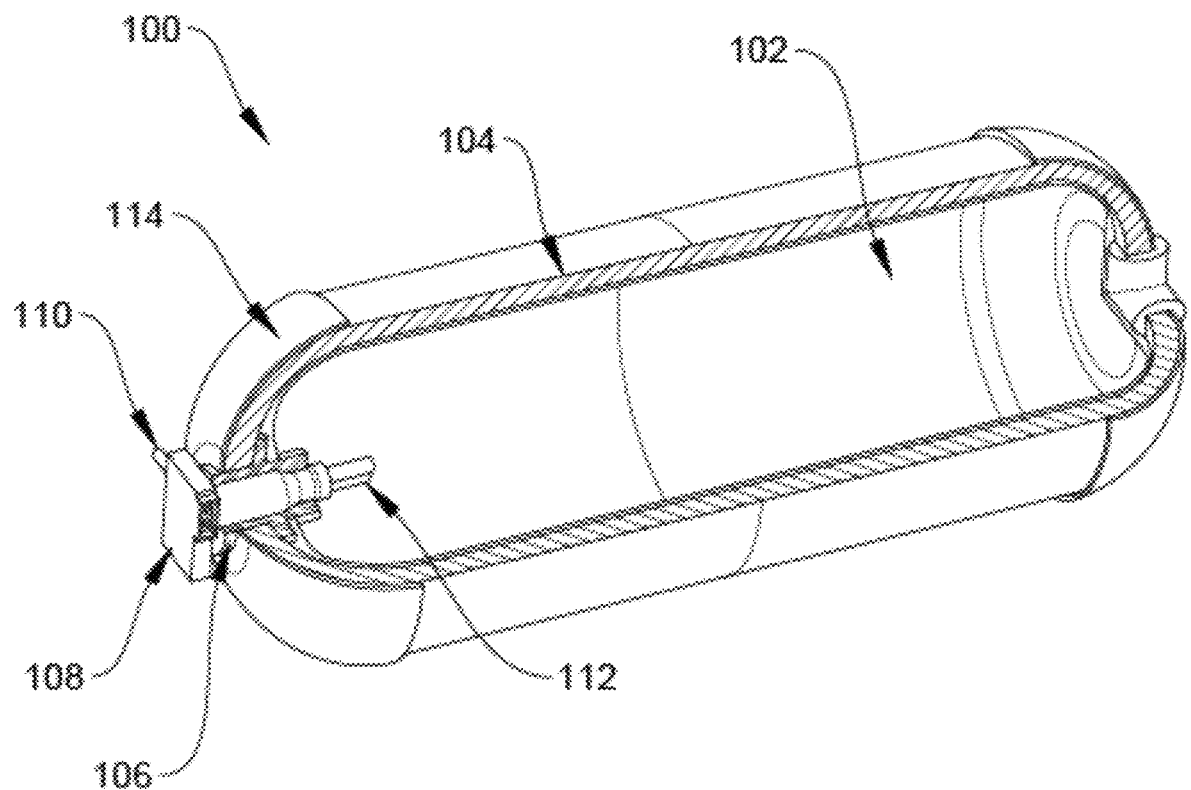
FIG. 13 is a perspective, partially cutout, view of a pressure vessel.
Figure 14:
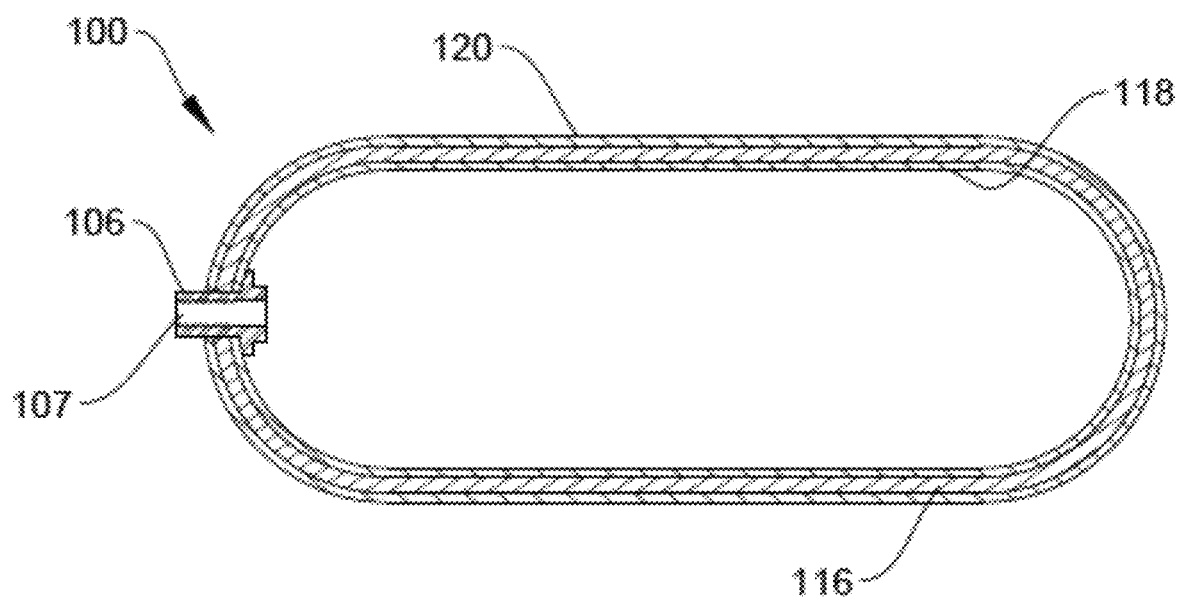
FIG. 14 is a cross-sectional view of an embodiment of the pressure vessel according to the present invention.

Referring now to FIGS. 13 and 14, there is shown a composite overwrapped pressure vessel 100. The pressure vessel includes a high-density polymer liner 102 overwrapped with a carbon fiber composite 104. This is one embodiment of a general design of the present invention, when it is appreciated that the carbon fiber composite of FIG. 13 does not explicitly show the discontinuous fiber layer of the present invention. A boss 106 includes a valve 108 and a thermally activated pressure relief device 110 that is activated by a temperature sensor 112 located inside the vessel 100. Additionally, a layer of dome protection 114 can be added to provide additional protection from inadvertent damage.

FIG. 14 is a simplified cross-sectional view taken through a pressure vessel of the present invention. FIG. 14 now explicitly shows the discontinuous fiber layer 116 of the COPV of the present invention. More specifically, FIG. 14 shows a high-pressure COPV 100 with a cylindrical shape. It can be appreciated that, while FIG. 14 shows the COPV with a cylindrical shape, the COPV can be formed with other shapes as well, such as a spherical shape, or a shape that conforms to the space that the COPV will occupy, which can be an asymmetrical shape. At one end of the COPV in FIG.

14 is an opening 107 in the boss for receiving, for example, hydrogen. The COPV further includes an inner layer 118 formed, for example, as a polymer liner. The middle layer can include the aligned discontinuous fibers 116, that is, an aligned discontinuous fiber reinforced composite, as described above. An outer layer 120 can include a continuous fiber layer, that is, a continuous fiber reinforced composite. As indicated in FIG. 14, the composite does not build up on the end domes as it would on a conventional filament wound COPV.

Figure 15:
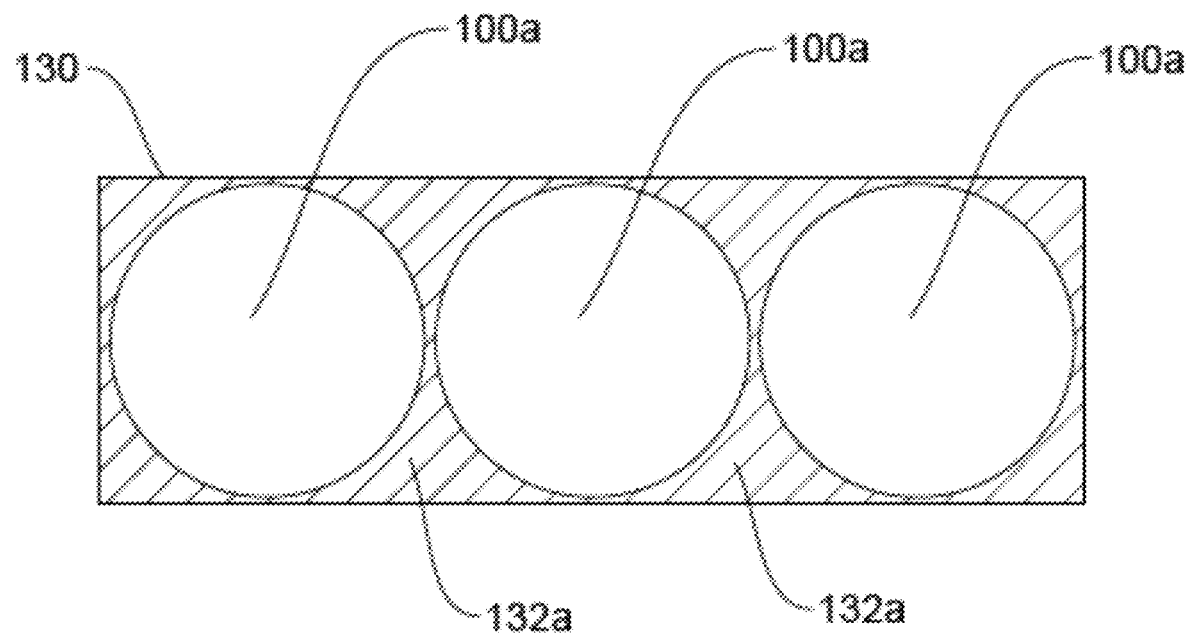
FIG. 15 includes two illustrations, two side views of a group of pressure vessels, one group being a group of three pressure vessels showing nonconformable pressure vessels, the other group (just below the group of nonconformable pressure vessels) being a group of three pressure vessels that are conformable pressure vessels.
Figure 15:
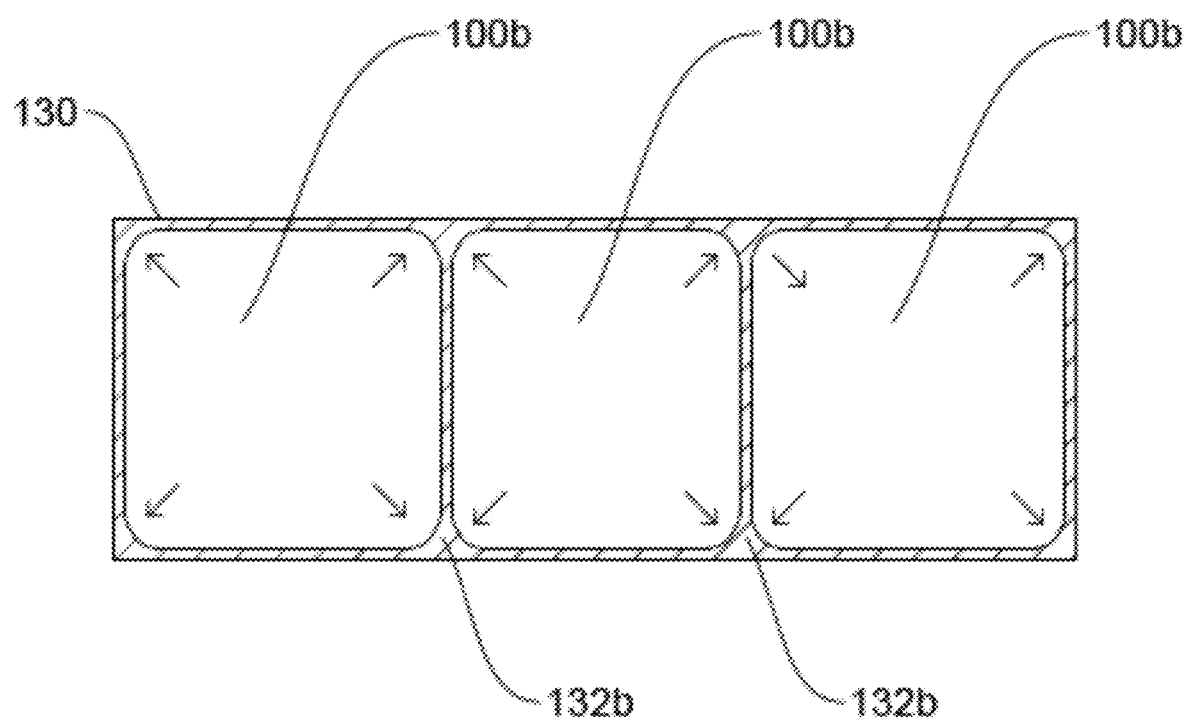

Referring now to FIG. 15, there is shown at the top of the figure a group of three pressure vessels 100a within a rectangular constraint or holder 130. Being nonconformable pressure vessels they retain their circular cross section (for example, for a cylindrical pressure vessel) within the holder. Each of these pressure vessels is shown to have an external composite layer. As the figure shows, there is a lot of wasted space 132a between the holder and the outer surface of each of the pressure vessels. The amount of wasted space can be calculated where "r" is the radius of the circle. Accordingly, the area of the circle is $\pi r^2$ and the area of a square is $(2r)^2$. Thus, one can express the circle area over the square area as $\pi r^2/(2r)^2$ which is the same as $\pi/4$, which itself equals 79%. This means that the area of wasted space is about 21%, which is equivalent to the amount of wasted space in the drawing of the nonconformable pressure vessels in the rectangular holder.

On the other hand, conformable pressure vessels conform, at least in part, to the shape of their holder, as indicated by the lower illustration in FIG. 15 showing a group of three conformable pressure vessels 100b (below the group of three nonconformable pressure vessels). The conformable pressure vessels do not have a circular cross-section but take on more of a square cross-section, like their generally rectangular holder or outer envelope 130, which can be a composite as shown in the illustration. The arrows indicate where the conformable pressure expands to maximize its area/volume. As can be appreciated by those skilled in the art, the amount of wasted space 132b is considerably less than the wasted space 132a.

Both nonconformable and conformable pressure vessels can be made according to the present invention. For instance, with respect to the nonconformable COPVs, aligned discontinuous fiber composite can be used so that it will move during consolidation with internal pressure, in order to more efficiently fill the available space, for example, in a holder or envelope. Likewise, the present invention is also applicable to the pressure vessels shown at the bottom of FIG. 15 which are known as "Conformable Storage." The present invention can be used with the conformable pressure vessels as well such that the aligned discontinuous fiber composite can be used so that it will move during consolidation with internal pressure, in order to more efficiently fill the available space of the outer mold. Thus, the present invention can be used to produce conformable pressure vessels that take on a variety of shapes. In all cases, the outer envelope must be constrained during consolidation. Thus, such nonconformable pressure vessels with atypical shapes can be tailored in wall thickness and geometry to provide a vessel that can save space and have strength and volume equal to a cylinder, though with a non-cylinder shape that allows for mounting and configuration.

Referring now to FIGS. 16-23, there is shown various conventional conformable storage vessels with various configurations. That is, the high-pressure COPVs of the present invention can be manufactured to have any of the configurations shown in FIGS. 16-23 and can be used in any of the ways shown in FIGS. 16-23, as FIGS. 16-23 are being provided merely by way of example and not by way of limitation. Thus, the high-pressure COPVs of the present invention, while they can take on any of the configurations shown in FIGS. 16-23 or any other configuration, the high-pressure COPVs of the present invention provide improved performance for any such configuration.

Figure 16:
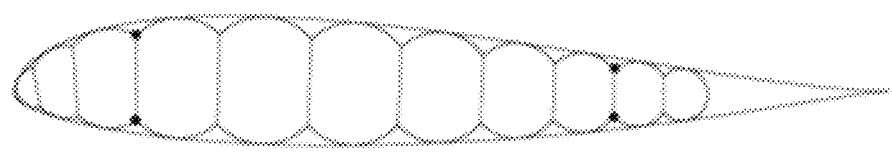
FIG. 16 is an example of a pressure vessel that can be manufactured with the method of the present invention.

FIG. 16 shows a sectional view of conformable storage vessels in a wing-like structure, such as an airplane wing.

Figure 17A:
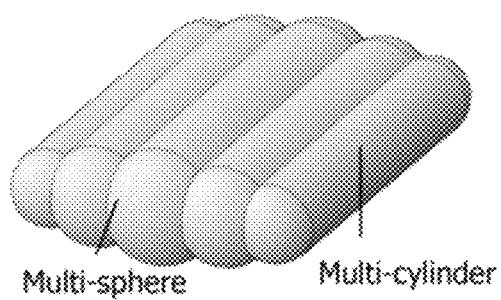
FIG. 17A is another example of a pressure vessel that can be manufactured with the method of the present invention.
Figure 17B:
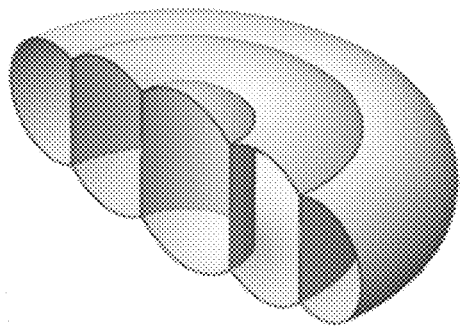
FIG. 17B is another example of a pressure vessel that can be manufactured with the method of the present invention.

FIG. 17A shows a perspective view of a plurality of pressure vessels including multi-cylinder and multi-sphere vessels. FIG. 17B shows a perspective sectional view of a plurality of pressure vessels which are concentric to one another and have a torus configuration.

Figure 18:
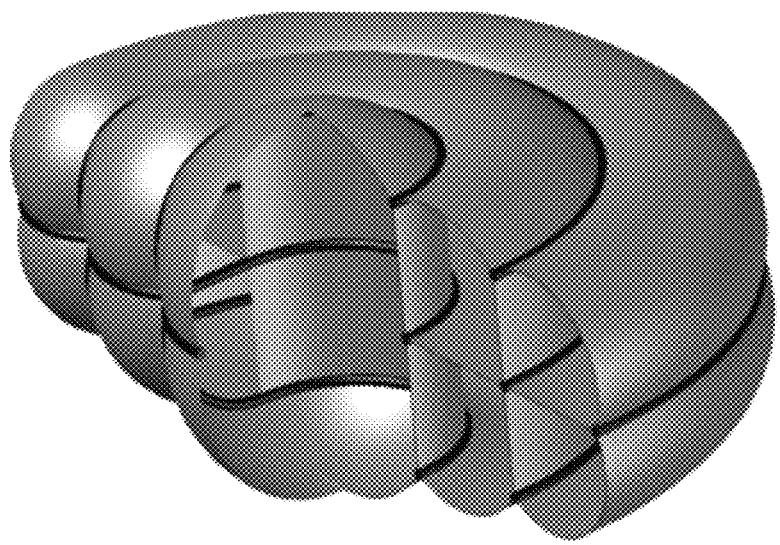
FIG. 18 is another example of a pressure vessel that can be manufactured with the method of the present invention.

FIG. 18 shows a perspective, partially sectioned, view of a plurality of pressure vessels which are at least partially concentric to one another and have at least partially a torus configuration, together with four membranes that intersect.

Figure 19:
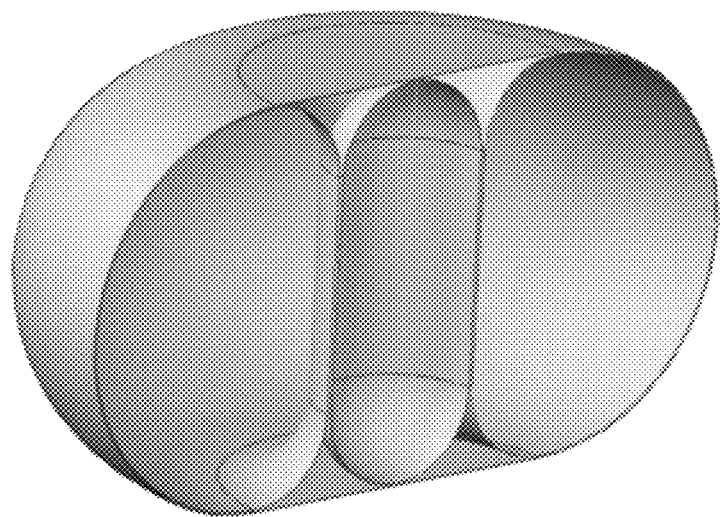
FIG. 19 is another example of a pressure vessel that can be manufactured with the method of the present invention.

FIG. 19 shows a perspective sectional view of a plurality of pressure vessels, one configured as a torus and the other as a cylinder with rounded ends, and having an absence of intersections.

Figure 20:
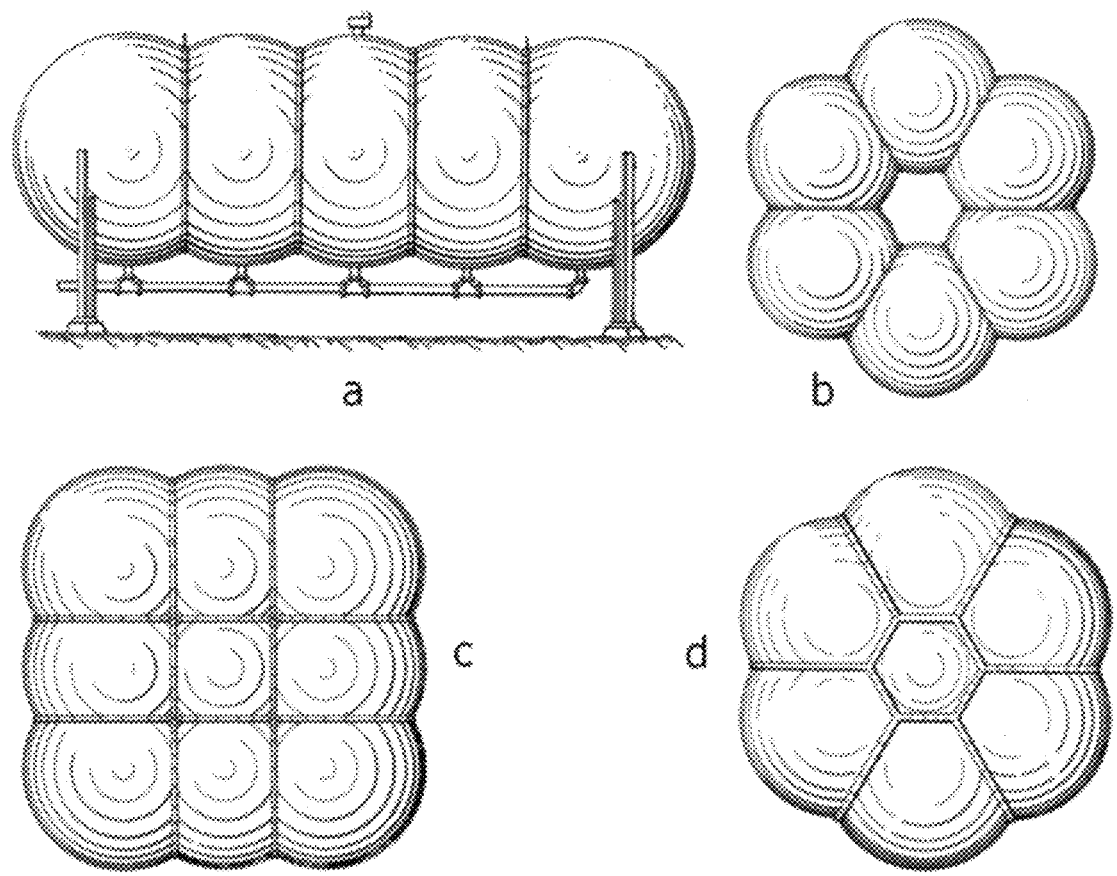
FIG. 20 is another example of a pressure vessel that can be manufactured with the method of the present invention.

FIG. 20, at each of a, b, c, and d, shows a perspective view of a plurality of pressure vessels (tanks) which are generally spherical except where they contact one another.

Figure 21:
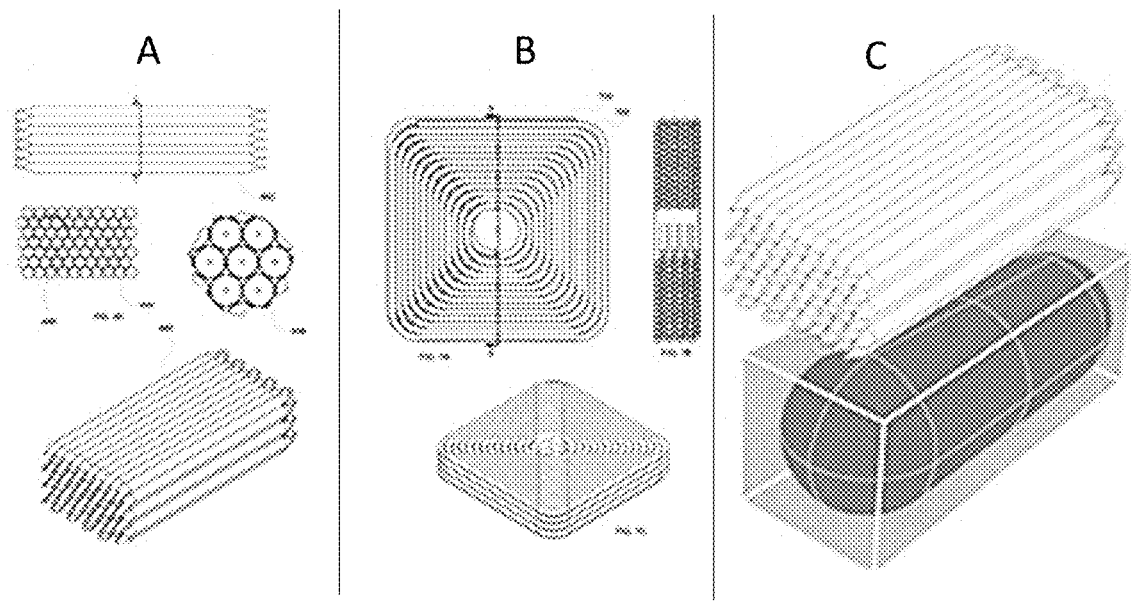
FIG. 21 is another example of a pressure vessel that can be manufactured with the method of the present invention.

FIG. 21 shows three groups A, B, and C of a plurality of pressure vessels generally referred to as intestinal to indicate their interconnected tubular nature with the groups being delineated by two dividing lines. Group A shows four views of the plurality of pressure vessels: a perspective view (bottom); and end view (middle-left); a side view (top); and a sectional view (middle-right) taken in the vicinity of the circle in the end view. The vessels of group A generally have a tubular configuration. Group B shows three views of the plurality of pressure vessels: a perspective view (bottom); a top view (top-left); and a sectional view (top-right) taken along the vertical line through the middle of the top view. The vessels of group B appear to have a disc-shape, with a hole in the central region thereof. Group C shows two views: a perspective view (top) of a plurality of pressure vessels, like the perspective view in Group A; and a perspective view (bottom) of a single pressure vessel, within a rectangular box. Group C shows a comparison of the two configurations in Group C, that the single pressure vessel (bottom) occupies less of the rectangular box than would the plurality of pressure vessels (top).

Figure 22:
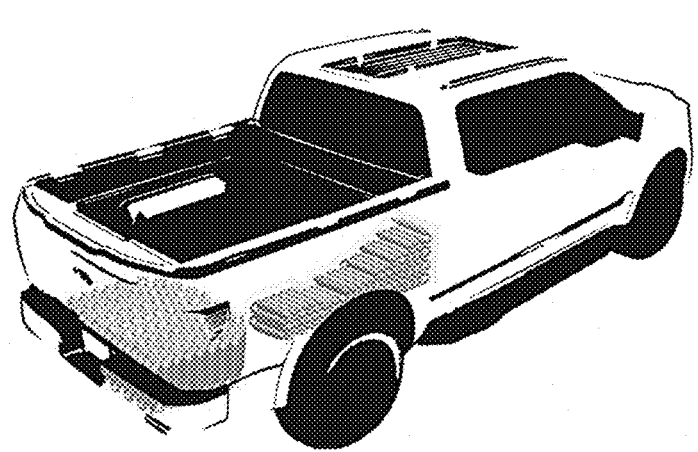
FIG. 22 is another example of a pressure vessel that can be manufactured with the method of the present invention.

FIG. 22 shows a perspective view of a vehicle with a plurality of pressure vessels, that the plurality of pressure vessels with their configurations in FIG. 22 occupy a given space so as to lessen the amount of wasted space.

Figure 23:
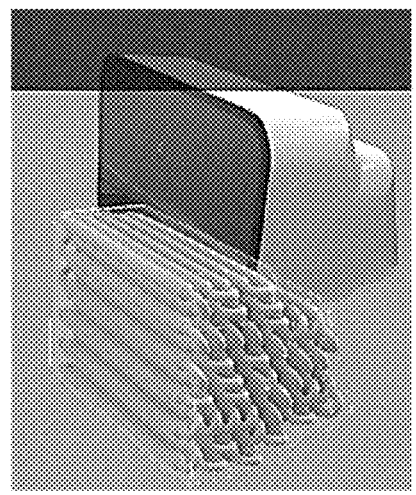
FIG. 23 is another example of a pressure vessel that can be manufactured with the method of the present invention.

FIG. 23 shows a perspective view of a pressure vessel, manufactured by Noble Gas Systems including: a liner, which can be a thermoplastic elastomer that provides flexibility and a permeation barrier; and a reinforcement layer, of woven synthetic fiber for containing pressure. The shape of the pressure vessel is generally linear, and a woven braid enables conformability without collapse. The pressure vessel includes a plurality of generally cylindrically shaped bodies and a plurality of tubular bodies of smaller diameter that the cylindrically shaped bodies. The cylindrically shaped bodies are interlinked in series by the tubular bodies each of which is connected to ends of the cylindrically shaped bodies and folded in FIG. 23 so that the cylindrically shaped bodies are stacked atop one another and thereby occupy as asymmetrically shaped space, as indicated in FIG.

23, the pressure vessel being exploded from its container defining the asymmetrically-shaped space for ease of viewing.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a high-pressure composite pressure vessel configured to contain a gas and/or liquid, the method comprising the steps of:
   providing an expandable core vessel defining a hoop section between end domes;
   providing an aligned discontinuous fiber composite material, the aligned discontinuous fiber composite material comprising fibers that are at least 5 mm in length and up to 100 mm in length, wherein the fibers are aligned in a prepreg tape;
   wrapping the expandable core vessel with an aligned discontinuous fiber-reinforced composite, wherein the aligned discontinuous fiber-reinforced composite is wrapped aligning with a plurality of load paths present in the expandable core vessel being over the hoop section and end domes;
   wrapping the expandable core vessel with a continuous fiber-reinforced composite, wherein the continuous fiber-reinforced composite is wrapped over the aligned discontinuous fiber-reinforced composite and wherein the continuous fiber-reinforced composite is wrapped along the hoop section and not wrapped along the end domes;
   pressurizing the expandable core vessel, wherein the expandable core vessel is configured to expand applying pressure to the aligned discontinuous fiber-reinforced composite and the continuous fiber-reinforced composite;
   heating the expandable core vessel and consolidating the composite overwrap; and
   cooling the expandable core vessel under pressure resulting in the high-pressure composite pressure vessel.

2. The method of claim 1, including the step of constraining an expansion of the expandable core vessel after the step of heating the expandable core vessel and consolidating the composite overwrap but before the step of cooling the expandable core vessel under pressure resulting in the high-pressure composite pressure vessel.

3. The method of claim 2, wherein the step of constraining includes using at least one of a continuous fiber composite overwrap, a mold, and a higher temperature polymer film.

4. The method of claim 1, wherein a composite material of the discontinuous fiber reinforced composite comprises a thermoplastic composite or a thermoset composite.

5. The method of claim 1, wherein the expandable core vessel comprises a polymer liner, a bladder or a shape memory bladder.

6. The method of claim 1, wherein the aligned discontinuous fiber composite material comprises fibers that are at least 10 mm in length and up to 100 mm in length.

7. The method of claim 1, wherein the aligned discontinuous fiber composite material comprises fibers that are at least 25 mm in length and up to 100 mm in length.

8. The method of claim 1, wherein the aligned discontinuous fiber composite material comprises fibers that are at least 50 mm in length and up to 100 mm in length.

9. The method of claim 1, wherein the high-pressure composite pressure vessel is configured to hold compressed hydrogen at greater than or equal to 700 bar.

10. The method of claim 1, wherein the high-pressure composite pressure vessel is configured to hold compressed natural gas at greater than or equal to 200 bar.

11. The method of claim 1, wherein the step of wrapping the expandable core vessel with the aligned discontinuous fiber-reinforced composite utilizes a process of filament winding.

12. The method of claim 1, wherein the step of wrapping the expandable core vessel with the aligned discontinuous fiber-reinforced composite utilizes a process of fiber placement.

13. The method of claim 1, wherein the step of wrapping the expandable core vessel with the aligned discontinuous fiber-reinforced composite utilizes a process of fiber patch preforming, wherein each patch is longer than a minimum fiber length and placing the patches with offsetting cuts.

14. The method of claim 1, wherein, after the step of wrapping the expandable core vessel with the aligned discontinuous fiber-reinforced composite but before the step of wrapping the expandable core vessel with a continuous fiber-reinforced composite, including the step of wrapping the expandable core vessel with a preliminary continuous fiber-reinforced composite, wherein the preliminary continuous fiber-reinforced composite is wrapped aligning with the plurality of load paths present in the expandable core vessel being over the hoop section and end domes.

15. The method of claim 1, wherein the high-pressure composite pressure vessel is configured for the high-pressure being at or above 70 bar (1000 PSI or 7 MPa).

16. A method of manufacturing a high-pressure composite pressure vessel configured to contain a gas and/or liquid, the method comprising the steps of:
   providing an expandable core vessel;
   providing an aligned discontinuous fiber composite material, the aligned discontinuous fiber composite material comprising fibers that are at least 5 mm in length to 100 mm in length or less, wherein the fibers are aligned in a prepreg tape;
   wrapping the expandable core vessel with an aligned discontinuous fiber-reinforced composite;
   wrapping the expandable core vessel with continuous fiber-reinforced composite;
   pressurizing the expandable core vessel, wherein the expandable core vessel is configured to expand applying pressure to the aligned discontinuous fiber-reinforced composite and the continuous fiber-reinforced composite;
   heating the expandable core vessel and consolidating the composite overwrap; and
   cooling the expandable core vessel under pressure resulting in the high-pressure composite pressure vessel.

17. The method of claim 16, wherein the aligned discontinuous fiber composite material comprises fibers that are at least 10 mm in length to 100 mm in length or less.

18. The method of claim 16, wherein the aligned discontinuous fiber composite material comprises fibers that are at least 25 mm in length to 100 mm in length or less.

19. The method of claim 16, wherein the aligned discontinuous fiber composite material comprises fibers that are at least 50 mm in length to 100 mm in length or less.

20. The method of claim 16, wherein the high-pressure composite pressure vessel is configured for the high-pressure being at or above 70 bar (1000 PSI or 7 MPa).

* * * * *

UNITED STATES PATENT AND TRADEMARK OFFICE
CERTIFICATE OF CORRECTION

PATENT NO. : 11,873,947 B2
APPLICATION NO. : 17/664283
DATED : January 16, 2024
INVENTOR(S) : David Edgar Hauber It is certified that error appears in the above-identified patent and that said Letters Patent is hereby corrected as shown below:

In the Claims

Column 12, Claim 16, Line 49, "with continuous" should read --with a continuous--.

Signed and Sealed this
Nineteenth Day of March, 2024

Katherine Kelly Vidal
*Director of the United States Patent and Trademark Office*